US006108356A

United States Patent [19]

Yin

[11] Patent Number: 6,108,356

[45] Date of Patent: Aug. 22, 2000

[54] INTRACAVITY OPTICAL PARAMETRIC OSCILLATORS

[75] Inventor: Yusong Yin, Stony Brook, N.Y.

[73] Assignee: Photonics Industries International, Inc., Bohemia, N.Y.

[21] Appl. No.: 09/264,181

[22] Filed: Mar. 5, 1999

[51] Int. Cl.[7] .......... H01S 3/10

[52] U.S. Cl. .......... 372/22; 372/10; 372/99; 372/106; 359/329

[58] Field of Search .......... 372/22, 99, 10, 372/106, 21; 359/329

[56] References Cited

U.S. PATENT DOCUMENTS

| | | | |
|---|---|---|---|
| 5,781,571 | 7/1998 | Nabors et al. | 372/21 |
| 5,905,748 | 5/1999 | Xie | 372/22 |
| 5,946,338 | 8/1999 | Bettman | 372/22 |
| 5,949,802 | 9/1999 | MacKinnon et al. | 372/22 |
| 5,960,015 | 9/1999 | Xie | 372/22 |

*Primary Examiner*—Leon Scott, Jr.
*Attorney, Agent, or Firm*—James A. Quinton, Esq.

[57] ABSTRACT

According to the invention, a method and an apparatus for producing a laser beam having a preselected output frequency which has a longer wavelength than does the fundamental beam of the lasing medium is provided. In one aspect of the invention a laser resonator cavity is formed between two reflective surfaces such as mirrors. A lasing medium is located within the laser resonator cavity for generating a fundamental wavelength beam. An optical parametric oscillator cavity is also formed between one of the laser resonator cavity reflective surfaces and a third reflective surface for example a mirror. A nonlinear crystal cut for phase matching conditions for the fundamental beam wavelength and the output beam wavelength is located in optical communication with the first and the third reflective surfaces. The optical axis of the laser resonator and the optical parametric oscillator are at least partially separate and partially overlap. The fundamental wavelength beam produced by the lasing medium is directed into the optical parametric oscillator cavity and incidents on the nonlinear crystal where a portion of the fundamental wavelength beam is converted to a preselected output wavelength beam along with the idler beam having a longer wavelength than the fundamental beam. The fundamental beam and the output wavelength beams are reflected back across the nonlinear crystal to form additional output wavelength beam. The output wavelength beam is separated from the fundamental wavelength beam. The separated fundamental beam is then directed back across the lasing medium for further amplification. The separated output wavelength beam is directed across the nonlinear crystal for amplification. A portion of the output wavelength beam is directed outside the oscillator cavity as the output of the laser.

20 Claims, 2 Drawing Sheets

M1
NC
M3
Nd:YAG
QS1
M2
M4
Output

Wavelength coverage of Nd:YAG or Nd:YLF pumped OPO's

INTRACAVITY OPTICAL PARAMETRIC OSCILLATORS

FIELD OF THE INVENTION

The invention relates to compact high powered lasers that can be tuned for a wide range of output wavelengths.

BACKGROUND OF THE INVENTION

Optical parametric oscillators (OPO) have been developed. Lasers having a single cavity for both the pump laser and the optical parametric oscillator (OPO) have been proposed. However such lasers have limited tunability due to absorption by the laser crystal of beam wavelength generated by the OPO and difficulty to manufacturer low loss components. See U.S. Pat. No. : 5,687,186. Eye safe OPO's have been developed for use in radar applications which are located inside or outside the laser cavity. See ISPIE Vol. 1419, pps. 141–152 "Eye Safe Lasers Components, Systems and Applications" (1991).

SUMMARY OF THE INVENTION

According to the invention, a method and an apparatus for producing a laser beam having a preselected output frequency which has a longer wavelength than does the fundamental beam of the lasing medium is provided. Preferably a laser crystal is used in the laser apparatus.

In one aspect of the invention a laser resonator cavity is formed between two reflective surfaces such as mirrors. A lasing medium is located within the laser resonator cavity for generating a fundamental wavelength beam. An optical parametric oscillator cavity is also formed between one of the laser resonator cavity reflective surfaces and a third reflective surface for example a mirror. A nonlinear crystal cut for phase matching conditions for the fundamental beam wavelength and the output beam wavelength is located in optical communication with the first and the third reflective surfaces. The optical axis of the laser resonator and the optical parametric oscillator are at least partially separate and partially overlap. The fundamental wavelength beam produced by the lasing medium is directed into the optical parametric oscillator cavity and incidents on the nonlinear crystal where a portion of the fundamental wavelength beam is converted to a preselected output wavelength beam along with the idler beam having a longer wavelength than the fundamental beam. The fundamental beam and the output wavelength beams are reflected back across the nonlinear crystal to form additional output wavelength beam. The output wavelength beam is separated from the fundamental wavelength beam. The separated fundamental beam is then directed back across the lasing medium for further amplification. The separated output wavelength beam is directed across the nonlinear crystal for amplification. A portion of the output wavelength beam is directed outside the oscillator cavity as the output of the laser.

In another aspect of the invention, the optical parametric oscillator is eliminated. In such embodiment a laser resonator cavity is provided between two reflective surfaces preferably mirrors. A lasing medium for example an Nd:YAG or Nd:YLF crystal is provided within the cavity. Preferably a Q-switch is included. The fundamental beam from the lasing medium is directed across a nonlinear crystal to produce a preselected output beam that has a longer wavelength than that of the fundamental frequency beam. The fundamental beam and output frequency beam are reflected back across the nonlinear crystal by one of the cavity reflective surfaces for a second pass across the nonlinear crystal. The output frequency beam is separated from the remaining fundamental frequency beam and the output frequency beam is directed out the laser cavity. The fundamental frequency beam is reflected back across the lasing medium for amplification.

The preferred embodiment of the present invention is illustrated in the drawings and examples. However, it should be expressly, understood that the present invention should not be limited solely to the illustrative embodiment.

DETAILED DESCRIPTION OF THE INVENTION

Figure 4:
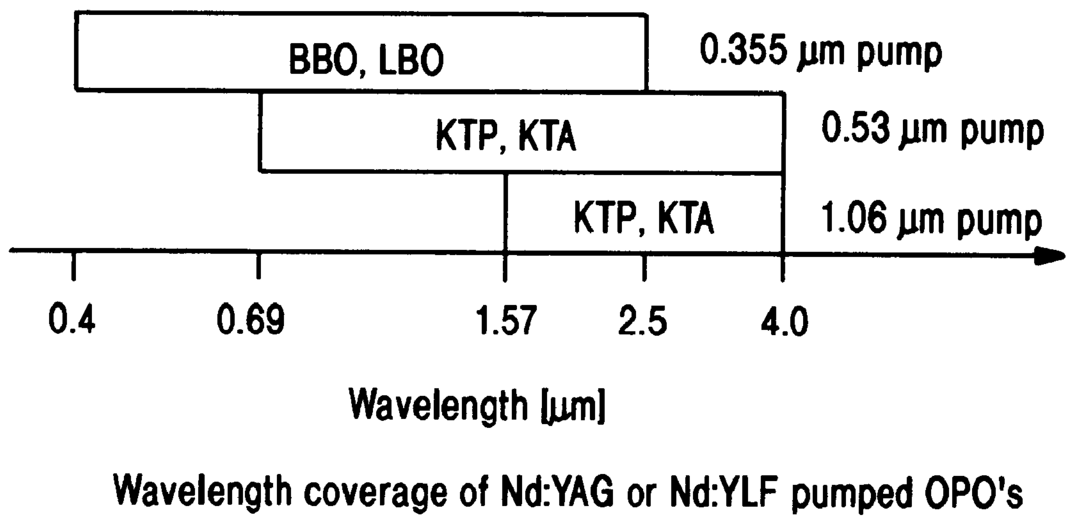
FIG. 4 is a graph showing wavelength coverage of various nonlinear crystals.

According to the invention, a method and an apparatus for producing a laser beam having a preselected output frequency which has a longer wavelength than does the laser beam of the lasing medium is provided. Preferably a lasing crystal is used in the laser apparatus. In one aspect of the invention a laser resonator cavity is formed between two reflective surfaces preferably reflective mirrors. A lasing medium is located within the laser resonator cavity for generating a fundamental wavelength beam. The lasing medium is preferably a laser crystal such as Nd:YLF, Nd:YAG, Nd:$YVO_4$ and Ti:Sapphire or other laser crystals which are selected to generate a preselected fundamental wavelength beam. According to the invention an optical parametric oscillator cavity is formed between one of the laser resonator cavity reflective surfaces and a third reflective surface, preferably a reflective mirror. A nonlinear crystal cut for phase matching conditions for the fundamental beam wavelength and a preselected output beam wavelength is located in optical communication with the first and the third reflective surfaces along the resonator optical axis. The nonlinear crystal can be selected from a number of such crystals depending on the wavelength of the fundamental beam from the lasing medium and the desired longer wavelength output beam. Such crystals include BBO, LBO, KTP, KTA, RTA, KRTA, $LiNbO_3$ crystals and the like. FIG. 4 shows some of the wavelength coverage for Nd:YAG or Nd:YLF laser pumped nonlinear crystals recognized in the art. The optical axis of the laser resonator and the optical parametric oscillator are at least in part separate. The fundamental wavelength beam produced by the lasing medium is directed through the optical parametric oscillator cavity and incidents on the nonlinear crystal where a portion of the fundamental wavelength beam is converted to a preselected output wavelength beam having a longer wavelength than the fundamental beam. The fundamental beam and the output wavelength beams are reflected back across the nonlinear crystal to form additional output wavelength beam. The output wavelength beam is separated from the fundamental wavelength beam. The separated fundamental beam is than directed back across the lasing medium preferably a laser crystal for further amplification. The separated output wavelength beam is directed across the nonlinear crystal for amplification. Since the output wavelength beam does not pass across the laser crystal or optional Q-Switch, problems with its absorption and insertion loss by the crystal and other components such as the Q-Switch are avoided. Such absorption and insertion losses can limit the tunable wavelengths for the laser and decrease the efficiency of conversion of the output wavelength beam. A portion of the output wavelength beam is directed outside the oscillator cavity as the output of the laser.

In another aspect of the invention, the laser does not include an optical parametric oscillator. In such alternative embodiment, a laser resonator cavity is provided between reflective surfaces preferably two reflective cavity mirrors. A lasing medium for example a Nd:YAG, Nd:YLF, Nd:$YVO_4$, Ti:Sapphire crystal or other suitable laser crystal is provided within the cavity. Preferable a Q-switch is included within the cavity. The fundamental beam from the lasing medium is directed across a nonlinear crystal selected as described above to produce a preselected output beam that has a longer wavelength than that of the fundamental frequency beam. The fundamental beam and output frequency beam are reflected back across the nonlinear crystal. The output frequency beam is separated from the remaining fundamental frequency beam and the output frequency beam is directed outside the cavity. The fundamental frequency beam is reflected back across the lasing medium for amplification. As a result, an effective method and apparatus, for producing a wide range of different wavelength beams is provided.

Figure 1:
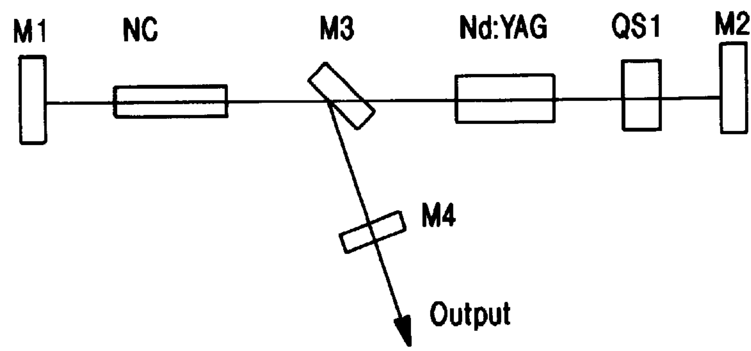
FIG. 1 is a schematic view of a laser according to the invention.
Figure 2:
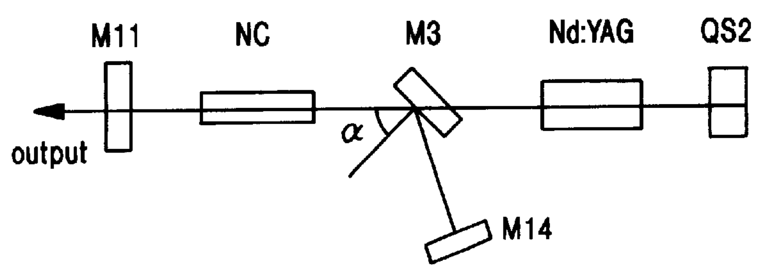
FIG. 2 is a schematic view of an alternate embodiment of a laser according to the invention.
Figure 3:
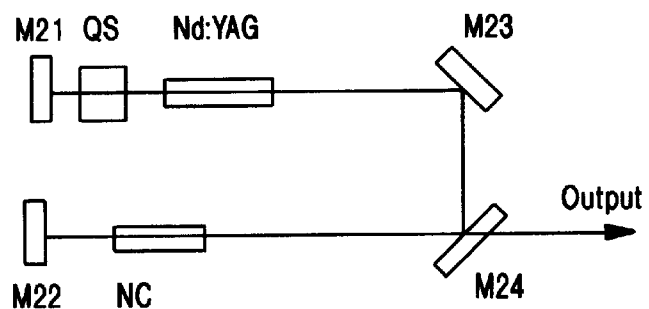
FIG. 3 is a schematic view of an alternate embodiment of a laser according to the invention.

As best seen in FIGS. 1 to 3 a laser according to the invention is provided which can be designed to produce output beams of various wavelengths which have a longer wavelength than that produced by the lasing medium. Referring to FIG. 1, a laser according to the subject invention is shown. A laser resonator cavity is formed between two reflective surfaces, preferably laser cavity mirrors M1 and M2. Mirror M1 is highly reflective for fundamental beam and also highly reflective for the preselected output wavelength beam which is produced by the device of FIG. 1. A lasing material LM is provided within the resonator cavity between mirrors M1 and M2 in optical communication with mirror M1 and M2. The lasing material is desirably a laser crystal preferably Nd:YAG or Nd:YLF laser crystal, optionally other laser crystals can be used for example Ti:Sapphire or Nd:$YVO_4$ or other appropriate lasing materials which produces a preselected fundamental wavelength beam which is then converted into a longer wavelength beam according to the invention. For example a Nd:YAG crystal lasing at a frequency of 1.06 $\mu$m can be used to provide an output beam at about 1.5 $\mu$m. An optical parametric oscillator cavity is setup between one of the resonator cavity reflective surfaces, desirably mirror M1 in FIG. 1 and another reflective surface, desirably a reflective mirror M4 to define an optical parametric oscillator cavity which is in part separate from the laser resonator cavity and in part has a different optical axis. The optical parametric oscillator cavity includes a reflective surface, desirably a mirror preferable a folding mirror most preferably a dichloric folding mirror M3 located at an acute angle to the resonator optical axis. Preferably the mirror M3 is located at an incident angle $\alpha$ of 30 to 70 degrees to the resonator optical axis and desirably at 50 to 60 degrees for example 56 degrees which is the Brewster angle for a fused silica substrate of M3. The dichloric mirror M3 is highly transmissive for fundamental beam traveling from either direction and highly reflective of output beam traveling from left to right in FIG. 1. Desirably the mirror M3 is coated for high transmission of P-polarization fundamental wavelength beam and high reflection of the output beam. Optionally, a separate polarizer can be used. Preferably the laser crystal side of the dichloric mirror is antireflection coated for fundamental frequency wavelength beam and is highly transmissive for the fundamental wavelength beam. If the fundamental beam incidents on the dichloric mirror at "P" polarization at the Brewster angle, the antireflection coating is unnecessary. Optionally, a Q-switch is provided within the laser resonator cavity to provide pulsed operation of the device. A number of Q-switches can be used such as an acoustsoptic, an electrooptical, a passive Q-switch such as a dye or $Cr_4$+:YAG. Desirably mirror M4 is partially reflective and partially transmissive for the output beam. Thus at least a portion of the output beam is reflected back to the optical parametric oscillator and a portion is directed out of the cavity as the output of the laser. The optical parametric oscillator cavity is thus defined between mirror M1 and M4. A nonlinear crystal NC is provided within the optical parametric cavity. The nonlinear crystal is cut for phase matching conditions for the fundamental beam wavelength and the output beam wavelength. In the embodiment shown in FIG. 1 the fundamental beam wavelength is 1.06 $\mu$m and the output wavelength beam is 1.5 $\mu$m. The nonlinear crystal is selected depending on the wavelength of the fundamental beam and the output beam sought to be provided. Many such crystals are known in the art. FIG. 4 shows some of the wavelength coverage available for nonlinear crystals for Nd:YAG and Nd:YLF laser crystals. For example, for a laser which would produce an output wavelength of approximately 1.5 $\mu$m a KTP or KTA crystal can be used. Alternatively a $LiNbO_3$ crystal can be used. In operation, the lasing material LM is excited for example by a flash lamp or diode pumping laser. The optional Q-Switch is provided for pulsed operation. At that point the fundamental beam is directed toward mirror M2 at the preselected fundamental wavelength, for example at 1.06 $\mu$m. Mirror M2 will reflect the fundamental wavelength beam back across the lasing material LM where it will be amplified and passed through mirror M3 which is highly transmissive for fundamental beam having a wavelength of 1.06 $\mu$m. This fundamental beam will then be directed across the nonlinear crystal NC desirably KTP or optionally a $LiNbO_3$ or other crystal where a portion of the beam will be converted to 1.5 $\mu$m wavelength beam. Both the fundamental and the output wavelength beams will then be reflected by mirror M1 and passed again across the nonlinear crystal NC where the output wavelength beam is amplified and directed toward mirror M3 wherein the unconverted fundamental beam will pass through dichloric mirror M3 which is highly transmissive to fundamental beam at 1.06 $\mu$m. The output beam having a wavelength of about 1.5 $\mu$m will be reflected by mirror M3 and directed to mirror M4 which is partially reflective and partially transmissive for the output beam wavelength in this instance for a wavelength of 1.5 $\mu$m. The reflected output beam will then be directed to mirror M3 where it is reflected back across the nonlinear crystal for further amplification. The fundamental and output beams from the nonlinear crystal are reflected by mirror M1 where the process will be repeated. The mirrors M1 and M4 act as optical parametric oscillator cavity mirrors and as indicated above M4 will also act as an output coupler for the output beam. Optionally M1 can be the output coupler.

The device of FIG. 2 is similar to that of FIG. 1. Mirror M2 is eliminated. Instead Q-switch is reflective coated to reflect fundamental beam thus eliminating the need for mirror M2. The mirror M3 is the same as described with respect to FIG. 1 as is the nonlinear crystal NC. According to the embodiment of FIG. 2, mirror M14 functions as one of the optical parametric oscillator cavity mirrors and is highly reflective for output beam wavelength. The output beam is substantially fully reflected by M14. Mirror M11 is reflective for a fundamental beam. M11 also acts as an output coupler for output wavelength beam. M11 is partially transmissive for output wavelength beam and partially reflective for the output wavelength beam. Substantially all of the unconverted fundamental beam is reflected by M11 back across nonlinear crystal NC and a portion of the output beam is also reflected across a nonlinear crystal NC for further amplification in the optical parametric oscillator cavity. As a result of the separate OPO resonator cavity and laser cavity, the transverse mode of fundamental beam and the output beam can be more easily matched as they pass across the nonlinear crystal by adjusting the parameters of mirror M4 or M14.

Referring now to FIG. 3, a further embodiment of the invention which eliminates the need for using an optical parametric oscillator is provided. In this embodiment mirrors M21 and M22 define a laser resonator cavity. A lasing medium preferably an ND:YAG or ND:YLF or Nd:$YVO_4$ crystal most preferably a Nd:YAG laser crystal is provided within the resonator cavity. Preferably a Q-switch QS is provided. For example for an Nd:YAG crystal, lasing occurs at about wavelength 1.06 $\mu$m. The fundamental beam is then directed to mirror M23 which is highly reflective for fundamental beam in this instance for fundamental beam at 1.06 $\mu$m. The fundamental beam is directed to mirror M24 which is highly reflective for fundamental beam at 1.06 $\mu$m and is highly transmissive for output beam at 1.5 $\mu$m. The fundamental beam is then directed across a nonlinear crystal nc chosen as described above for the nonlinear crystals described in connection with in FIGS. 1 and 2. The fundamental beam and output beam propagating from the nonlinear crystal NC are reflected by mirror M22 back across nonlinear crystal where a further portion of the fundamental beam is converted to output wavelength beam. M22 is highly reflective for both output wavelength beam and fundamental beam. The fundamental and output wavelength beams, are directed from the nonlinear crystal NC to mirror M24 where the output beam is transmitted outside the laser cavity and the unconverted fundamental beam is reflected to mirror M23 which inturn reflects the fundamental beam back across lasing medium LM where it is further amplified.

Preferably the lasing medium LM is a laser crystal most preferably a Nd:YAG or Nd:YLF crystal preferably Nd:YAG crystal. Optionally, other laser crystals such as Ti:Saphire and Nd:$YVO_4$ can be used.

The foregoing is considered as illustrative only to the principles of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A laser providing a preselected frequency laser output comprising:

a) a laser resonator having a laser resonator cavity formed between a first reflective surface and a second reflective surface said resonator having a resonator optical axis;

b) a lasing medium located within said laser resonator cavity for generating a fundamental wavelength beam;

c) an optical parametric oscillator (OPO) formed between said first reflective surface and a third reflective surface said optical parametric oscillator cavity having an oscillator optical axis which is in part separate from said resonator optical axis and which in part overlaps said resonator optical axis;

d) a nonlinear crystal located within said OPO cavity along said oscillator optical axis and along said resonator optical axis in optical communication with said first and said third reflective surface;

said nonlinear crystal oriented to convert said fundamental wavelength beam into a preselected output wavelength beam having a preselected longer wavelength than said fundamental beam;

e) means to direct said fundamental wavelength beam into optical parametric oscillator cavity along said oscillator optical axis and across said nonlinear crystal to convert a portion of said fundamental wavelength beam to a preselected output wavelength beam having a longer wavelength than said fundamental beam;

f) said first reflective surface reflective of fundamental wavelength beam and at least partially reflective of output wavelength beam;

g) means to direct said fundamental and output beams from said first reflective surface back across said nonlinear crystal to form additional output wavelength beam;

h) a beam separator to separate said output wavelength beam from said fundamental wavelength beam;

i) fundamental beam directing means to direct said separated fundamental beam back across said lasing medium for further amplification;

j) output beam directing means for directing said separated output wavelength beam to said third reflective surface where said beam is at least partially reflected across said nonlinear crystal;

k) an output coupler to direct a portion of said output wavelength beam outside said oscillator cavity.

2. A laser according to claim 1 wherein said first and second reflective surfaces are mirrors.

3. A laser according to claim 2 wherein said beam separator is a dichloric mirror.

4. A laser according to claim 3 wherein the beam separator is a dichloric mirror which transmits fundamental beam and reflects the output frequency beam.

5. A laser according to claim 4 further comprising a Q-switch located within said laser resonator cavity.

6. The laser of claim 3 wherein the lasing medium is Nd:YLF.

7. A laser providing a preselected frequency laser output comprising a laser resonator having a laser resonator cavity formed between a first mirror and a second mirror said resonator having a resonator optical axis;

a lasing crystal located within said laser resonator cavity for generating a fundamental wavelength beam;

an optical parametric oscillator cavity formed between said first mirror and a third mirror said optical parametric oscillator cavity having an oscillator optical axis which is in part separate from said resonator optical axis and in part overlaps said resonator optical axis;

a nonlinear crystal located within said parametric oscillator cavity along said oscillator optical axis in optical communication with said first and said third mirrors;

said nonlinear crystal in optical communication with said lasing crystal so that said fundamental wavelength beam incidents on said nonlinear crystal for conversion of a portion of said fundamental wavelength beam to said preselected output wavelength beam having a longer wavelength than said fundamental wavelength beam;

said first mirror reflective of fundamental wavelength beam and output wavelength beam to direct said fundamental beam and at least a portion of preselected output wavelength beam from said first mirror back across said nonlinear crystal to form additional output wavelength beam;

a dichloric mirror located along both the resonator optical axis and the oscillator optical axis said dichloric mirror located between said nonlinear crystal and said lasing medium and between said third mirror and said nonlinear crystal;

said dichloric mirror having a front side facing said lasing crystal and in optical communication therewith; and a back side opposed to said front side;

said dichloric mirror front side highly transmit fundamental wavelength beams;

said dichloric mirror back side in optical communication with said nonlinear crystal and third mirror said back side coated to transmit fundamental wavelength beam and reflective for said output wavelength beam;

an output coupler located in said optical parametric oscillator cavity to remove a portion of the preselected output wavelength beam from said optical parametric oscillator cavity.

8. A laser according to claim 7 wherein said dichloric mirror is located at an incident angle $\alpha$ of about 30 degrees to about 70 degrees.

9. A laser according to claim 8 wherein said dichloric mirror is located at an incident angle $\alpha$ of about 50 degrees to about 60 degrees.

10. A laser according to claim 7 wherein the dichloric mirror is located at an angle $\alpha$ equal to the Brewster instant angle.

11. A laser according to claim 7 where the lasing crystal is selected from any one of: Nd:YLF, Nd:YLG, Nd:$YVO_4$ or Ti:Sapphire.

12. A laser according to claim 7 further comprising a polarizer beam located along the resonator optical axis for p-polarizing said fundamental beam.

13. A laser according to claim 7 wherein said first mirror or said third mirror transmits a portion of said output frequency beam.

14. A laser according to claim 7 wherein further comprising a Q-switch located within said resonator optical cavity.

15. A laser providing a preselected output frequency beam comprising:

a) a first reflective surface and a second reflective surface to form an optical resonator cavity therebetween;

b) a lasing medium located within said cavity for generating a fundamental frequency beam of electromagnetic radiation (EMR) having a first preselected wavelength from the front end and the back end of said laser medium;

c) frequency modification means for converting a portion of said EMR of said first preselected fundamental frequency beam to said preselected output frequency beam having a longer wavelength than said fundamental frequency beam;

d) said frequency modification means including a nonlinear crystal oriented for phasing matching conditions for said fundamental frequency beam and/or said output frequency beam having a first EMR port for receiving and directing radiation through said nonlinear crystal whereby radiation will enter said first EMR port, propagate through said crystal and exit said second EMR port and vis versa;

e) means to direct said fundamental frequency beam and said output frequency beams from second EMR port to said second reflective surface to reflect said fundamental frequency and said output frequency beams to said second EMR port for propagation back through said nonlinear crystal;

f) an output beam separator in optical communication with said fourth EMR port to separate said output frequency beam from said fundamental frequency beam;

g) means to direct the separated output beam outside said optical resonator cavity;

h) directing means to direct said fundamental beam back through said lasing medium; and i) said first mirror in optical communication with EMR propagating from the back end of said laser medium to reflect said EMR back through said laser medium.

16. The laser of claim 15 wherein said lasing medium is a solid state laser medium.

17. The laser of claim 15 wherein the laser medium is selected from the group consisting of Nd:YLF, Nd:YAG, Nd:$YVO_4$ and Ti:Sapphire.

18. A method of providing a preselected frequency laser output comprising forming a laser resonator cavity between a first and a second reflective surface;

exciting a lasing medium within said laser resonator cavity for generating a fundamental wavelength beam;

forming an optical parametric oscillator cavity between said first reflective surface and a third reflective surface;

said optical parametric oscillator cavity having nonlinear crystal located in optical communication with said first and said third reflective surfaces;

directing said fundamental wavelength beam through said parametric oscillator cavity and passing said beam across said nonlinear crystal to convert a portion of said fundamental wavelength beam to a preselected output wavelength beam having a longer wavelength than said fundamental beam;

reflecting said fundamental beam back across said nonlinear crystal to form additional output wavelength beam;

separating said output wavelength beam from said fundamental wavelength beam;

directing said separated fundamental beam back across said lasing medium for further amplification;

directing said separated output wavelength beam across said nonlinear crystal to amplify said beam;

directing a portion of said output wavelength beam outside said oscillator cavity.

19. A method according to claim 18 wherein said nonlinear crystal is selected from the group consisting of BBO, LBO, KTP, KTA, RTA, KRTA and $LiNbO_3$.

20. A laser according to any one of claims 1–17 wherewin said nonlinear crystal is selected from the group consisting of BBO, LBO, KTP, KTA, RTA, KRTA and $LiNbO_3$.

* * * * *